United States Patent [19]

Boyd et al.

[11] Patent Number: 5,049,265

[45] Date of Patent: Sep. 17, 1991

[54] EFFLUENT TREATMENT SYSTEM

[75] Inventors: Hugh F. Boyd, Portrush; Michael T. Weldon, Balbriggan; Patrick J. Coffey, Newbridge; Brocan Carty, Geashill; Richard Kavanagh, Foxrock, all of Ireland

[73] Assignees: Bord Na Mona; Wavin Ireland Limited, both of Dublin, Ireland

[21] Appl. No.: 478,409

[22] Filed: Feb. 12, 1990

[30] Foreign Application Priority Data

Feb. 10, 1989 [IE] Ireland .................. 2435/88

[51] Int. Cl.⁵ ............................. C02F 3/04
[52] U.S. Cl. ................... 210/150; 210/188; 210/505; 210/615; 210/916
[58] Field of Search ........... 210/150, 151, 188, 253, 210/259, 503, 505, 615, 617, 916

[56] References Cited

U.S. PATENT DOCUMENTS

| | | | |
|---|---|---|---|
| 877,569 | 1/1908 | Joseph | 210/150 |
| 968,015 | 8/1910 | Wilkie | 210/151 |
| 1,805,852 | 5/1931 | Simpson | 210/150 |
| 2,220,859 | 11/1940 | Biepham et al. | 210/150 |
| 2,308,866 | 1/1943 | Dekema | 210/151 |
| 3,123,555 | 3/1964 | Moore | 210/151 |
| 3,325,016 | 6/1967 | Angst | 210/502.1 |
| 3,825,119 | 7/1974 | Rost | 210/150 |
| 3,894,355 | 7/1975 | Carothers | 210/617 |
| 3,933,641 | 1/1976 | Hadden et al. | 210/205 |
| 4,251,359 | 2/1981 | Colwell et al. | 210/617 |
| 4,465,594 | 8/1984 | Loak | 210/151 |
| 4,576,718 | 3/1986 | Reischl et al. | 210/151 |
| 4,662,900 | 5/1987 | Ottengraf | 210/615 |
| 4,678,582 | 7/1987 | Lavigne | 210/150 |

FOREIGN PATENT DOCUMENTS

| | | |
|---|---|---|
| 0233924 | 2/1987 | European Pat. Off. |
| 1156712 | 2/1959 | Fed. Rep. of Germany |
| 386174 | 6/1908 | France |
| 2337106 | 7/1977 | France |

Primary Examiner—Stanley S. Silverman
Assistant Examiner—Christopher Upton
Attorney, Agent, or Firm—Scully, Scott, Murphy & Presser

[57] ABSTRACT

An effluent treatment system 1, 70, 80 for treating effluent which has passed through a primary treatment step such as a septic tank 50 comprises a container 5 having inlets 7 for effluent and outlets 8 for filtered effluent. The container 5 contains a biological treatment medium 41 comprising a homogeneous mixture of young Sphagnum peat and an organic peat fibre. The medium 41 is covered by a layer 40 of peat fibre for distributing the effluent and another layer 44 of peat fibre is provided below the medium 41 to induce flow of treated effluent to the outlets 34.

21 Claims, 11 Drawing Sheets

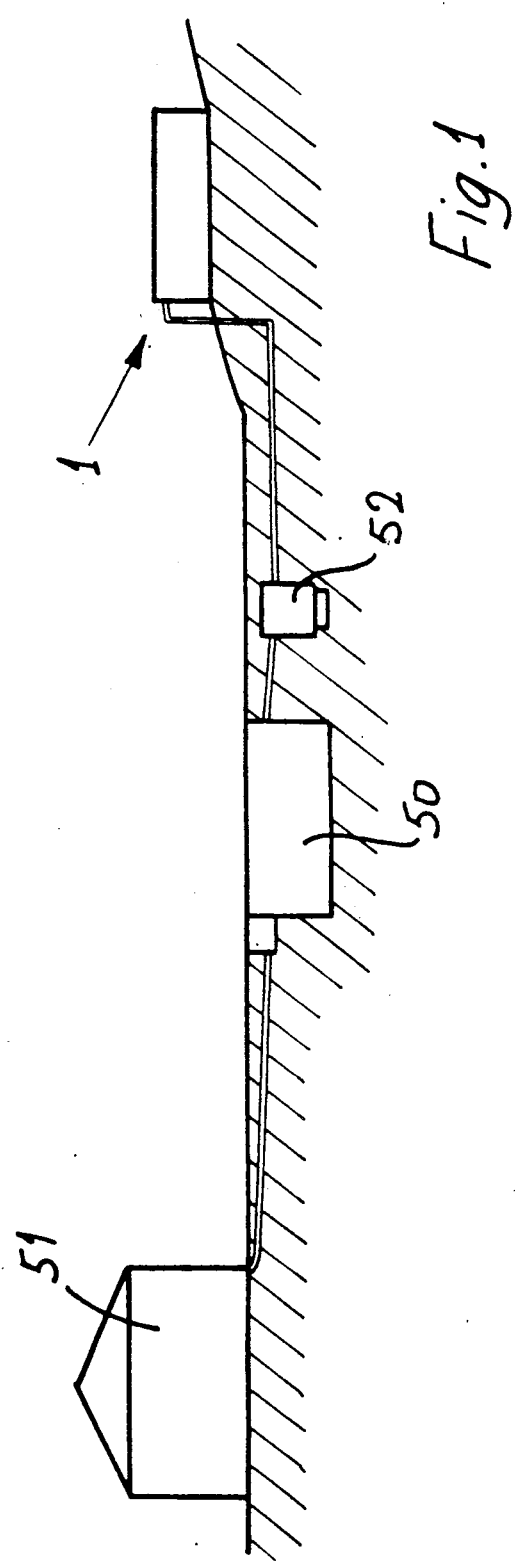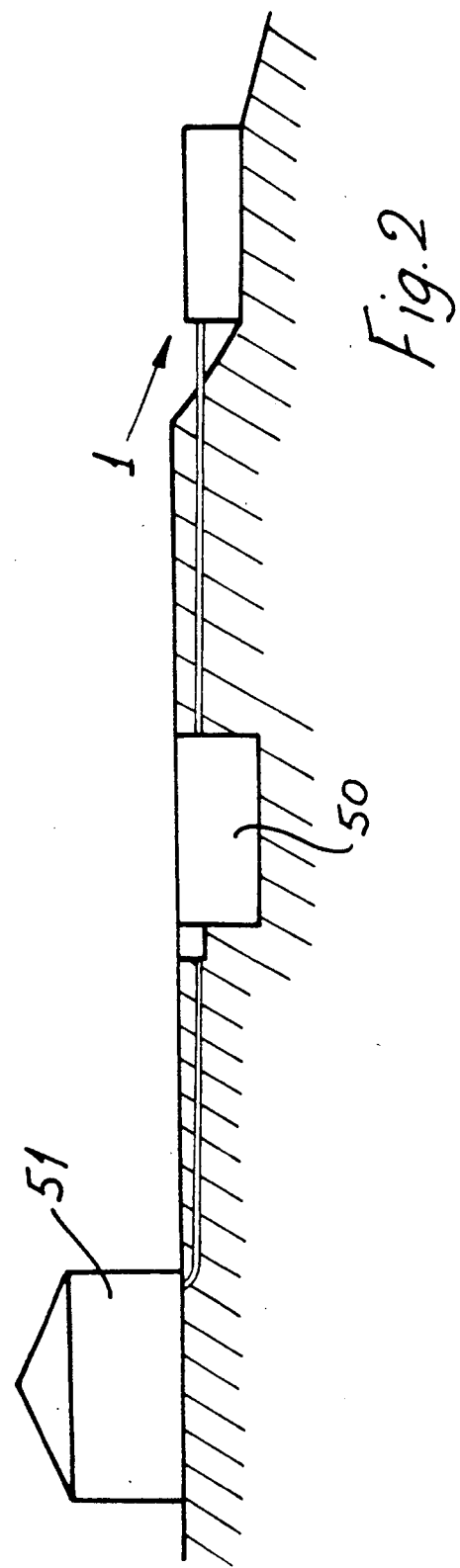

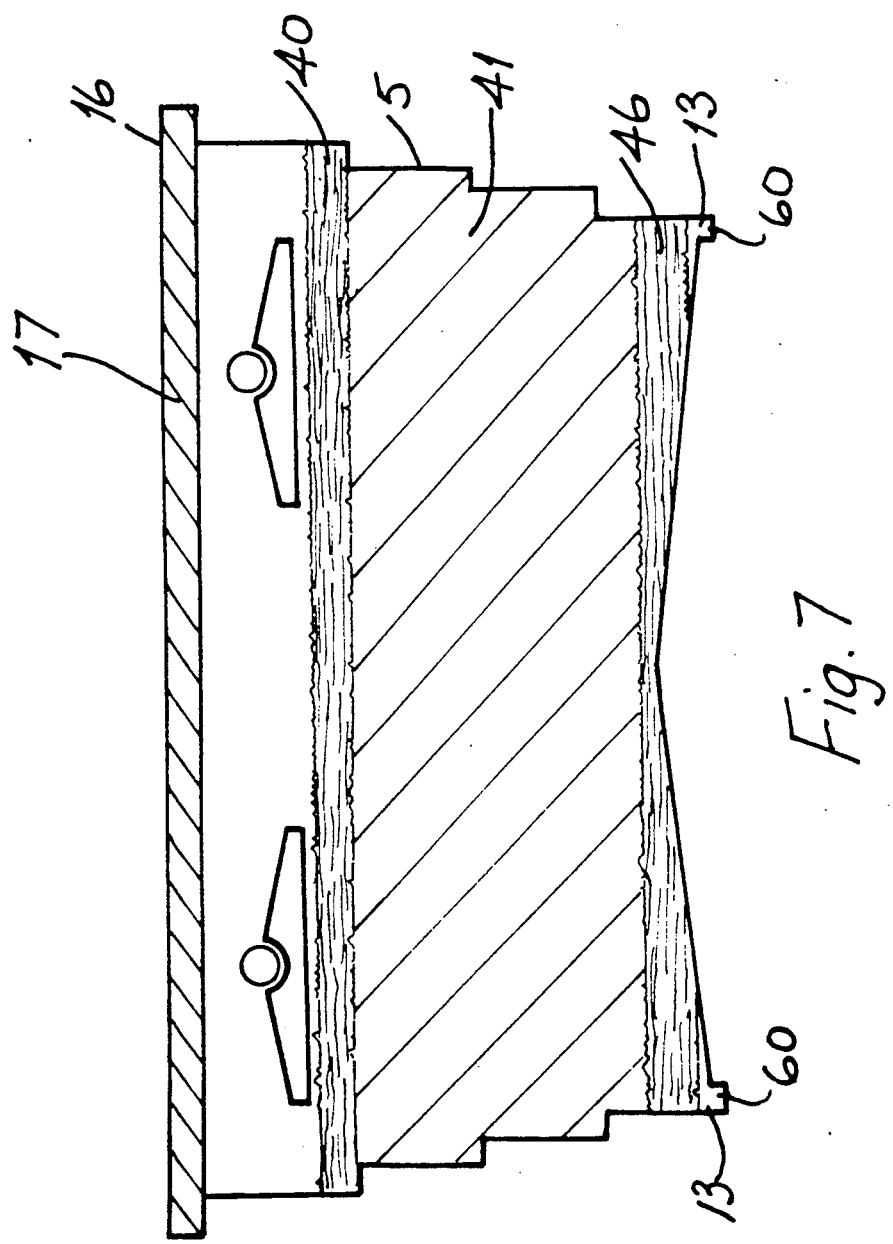

EFFLUENT TREATMENT SYSTEM

TECHNICAL FIELD OF THE INVENTION

The invention relates to an effluent treatment system and in particular to a system for treating effluent which has passed through a primary treatment step, for example through a septic tank, to remove a substantial proportion of solids.

Septic tanks are used in a variety of locations to cope with effluent from domestic and industrial sites. In rural Ireland, for example, there are presently 400,000 septic tanks to serve approximately one million people who do not have access to a public sewage system. Considerable pollution risks are posed by the discharge from septic tanks. Effluent seeping into ground with excessive soakage may percolate away to pollute a ground water source. Where ground soakage is insufficient, surface water systems may be polluted due to effluent discharges.

PRIOR ART

It is known to use some types of peat as biological treatment media. While such media are effective in treating effluent there is a tendency for the peat bed to become saturated if loadings in excess of minimum loadings are applied. This is known as "ponding" and has the effect of substantially reducing the effectiveness of the peat bed to perform its biological treatment function. To overcome this difficulty the loading rate on the peat bed is reduced. Thus, peat beds can accommodate only relatively low loadings which, because of the large surface area required, are expensive and impractical to use in many applications.

OBJECT OF THE INVENTION

This invention is directed towards providing an improved effluent treatment system which will overcome these and other difficulties with known systems.

SUMMARY OF THE INVENTION

According to the invention there is provided an effluent treatment system for treating effluent which has passed through a primary treatment to remove a substantial proportion of solids comprising:

a container having an upper inlet for effluent from a primary treatment and a lower outlet for treated effluent, a biological effluent treatment medium in the container, the biological effluent treatment medium comprising a homogenous mixture of biologically active peat and a fibrous material, We have found that the incorporation of fibrous material, particularly peat-based organic fibrous material having a relatively low absorptive capacity reduces ponding or clogging of the treatment medium and promotes drainage and as a consequence provides a system which can accommodate very high loading rates whilst retaining its capacity to effectively treat the effluent.

In one embodiment of the invention the ratio of peat to fibrous material in the medium is in the range of 10:90 to 90:10 by volume, preferably in the range 20:80 to 80:20, most preferably approximately 50:50. The higher the proportion of fibre the greater the ability of the medium to allow flow of effluent through. However, the higher the proportion of fibre in general the less the biological activity of the medium.

In a preferred embodiment of the invention the biologically active peat is a young Sphagnum peat.

Young Sphagnum peat is preferred because of its high water-holding capacity.

Preferably the peat is of a Von Post humification scale $H_1$ to $H_3$, most preferably $H_1$. Such peat is preferred because of its high water-holding capacity.

In a particularly preferred embodiment of the invention the fibrous material is an organic fibrous material, most preferably a peat fibre material.

Organic fibrous material, most preferably peat fibre is preferred because of its compatibility with the peat.

Preferably the peat fibre consistsa mainly of root residues of eriophorum (cottongrass) plants extracted from bog peats.

In one embodiment of the invention the mixture is compacted by from 20% to 75% by volume, preferably 30 to 60% by volume, most preferably approximately 50% by volume. The looser the medium the greater the risk of effluent flowing though without being treated. At higher levels of compaction, however, the greater the risk of the flow of liquid being retarded to the extent that poinding occurs.

Preferably an upper effluent distribution medium is provided above the biological effluent treatment medium to distribute effluent at the upper surface of the medium.

In a preferred arrangement the distribution medium is of an organic fibrous material for compatibility with the treatment medium.

Preferably a lower outlet flow inducing medium is provided below the biological effluent treatment medium at or adjacent to the effluent outlet.

In a preferred arrangement the outlet flow inducing medium is an organic fibrous material for compatibility with the treatment medium In one embodiment of the invention the depth of the effluent treatment medium is in the range 0.5 to 1.0 meters, most preferably approximately 0.75 meters for long term biological effectiveness of the system.

In a preferred embodiment of the invention the surface area of the effluent treatment medium is at least 7 square meters for a hydraulic loading of in the order of 7 cm to 15 cm per day of effluent.

In one arrangement the container has a top opening closed by an air permeable lid. The lid may comprise a perforated cover having an odour control layer of fibrous material.

In a preferred embodiment the system includes means for distributing effluent across the surface of the effluent treatment medium.

In one arrangement the means for distributing effluent comprises a rosette type distributor having a central inlet and a plurality of spaced-apart outlets fed from the common inlet. Preferably the distributor is a unitary formed structure, preferably a moulded body of polystyrene or the like.

In another arrangement the means for distributing effluent comprises a sheet of corrugated or the like material having a plurality of spaced-apart outlet holes.

In a further arrangement the means for distributing effluent across the surface of the effluent treatment medium comprises at least one pipe extending above the treatment medium, the pipe having a plurality of spaced-apart outlet holes.

Preferably a layer of stone chippings is provided underneath the pipe outlets for spreading and distributing effluent to be treated.

Preferably a layer of peat material is provided above the stone chippings for odour control.

In one embodiment of the invention the container is of a modular form, a number of containers being joined together and the effluent to be treated being spread across the containers, in parallel flow.

BRIEF DESCRIPTION OF THE DRAWINGS

The invention will be more clearly understood from the following description thereof given by way of example only with reference to the accompanying drawings in which:

FIG. 1 is a schematic side view of an effluent treatment system according to the invention, in use, FIG. 2 is a schematic side view of the effluent treatment system in another arrangement, in use, FIG. 7 is a side cross sectional view of a module.

DETAILED DESCRIPTION OF THE INVENTION

Figure 3:
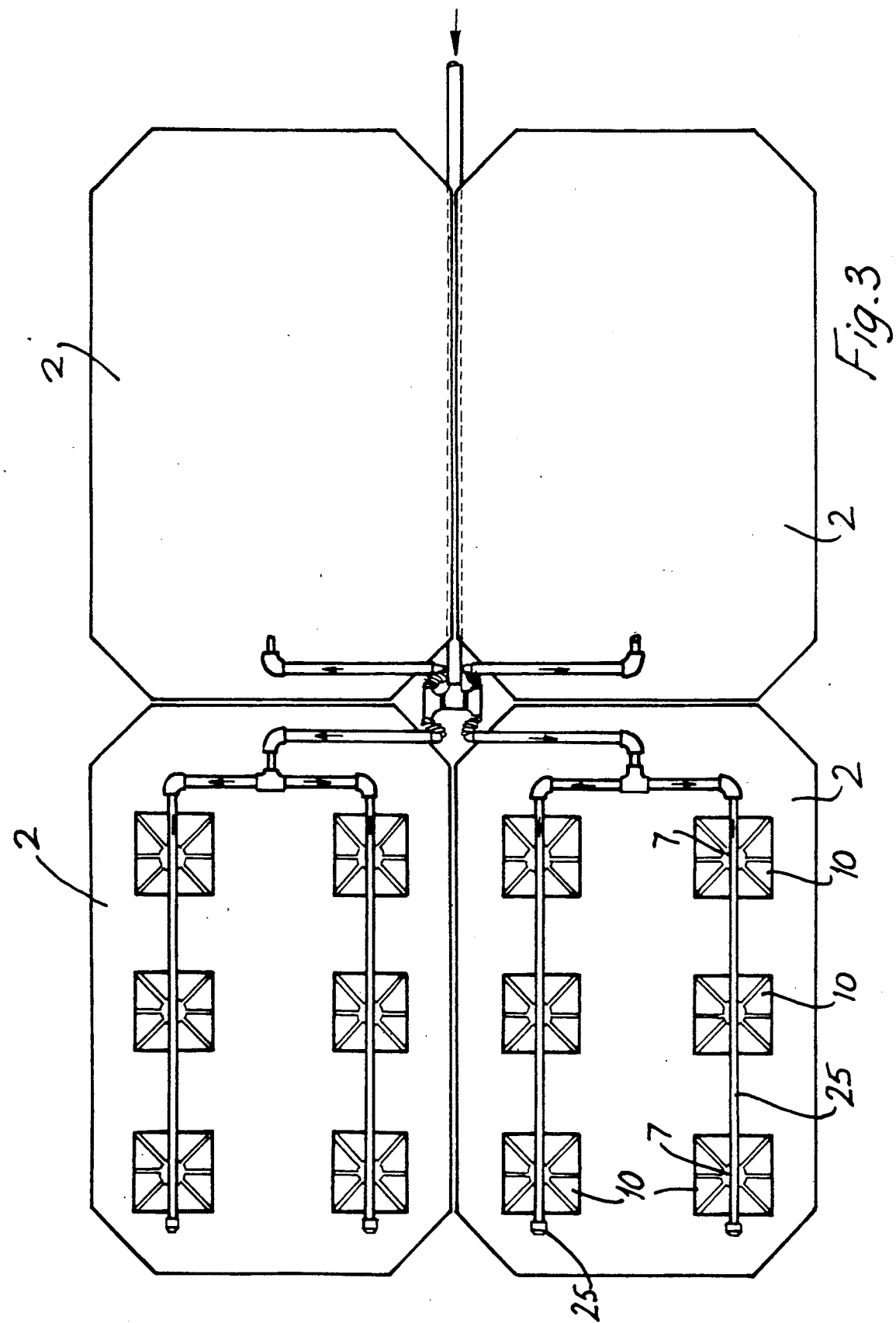
FIG. 3 is a plan view of a layout of an effluent treatment system according to the invention.
Figure 4:
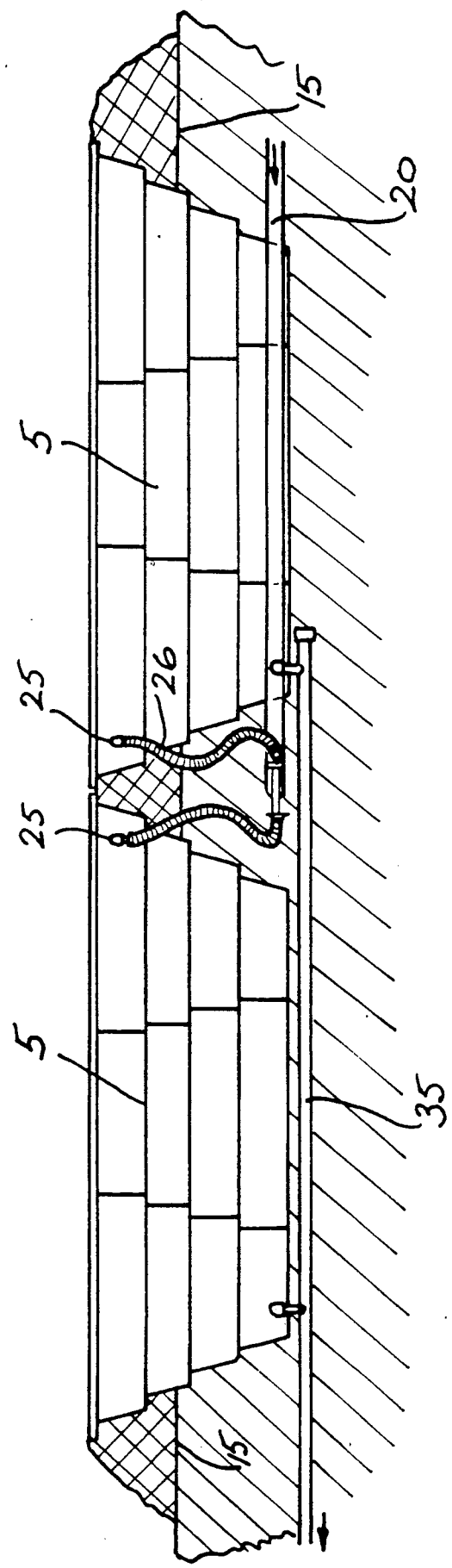
FIG. 4 is a cross-sectional view on the line Y—Y in FIG. 3.
Figure 5:
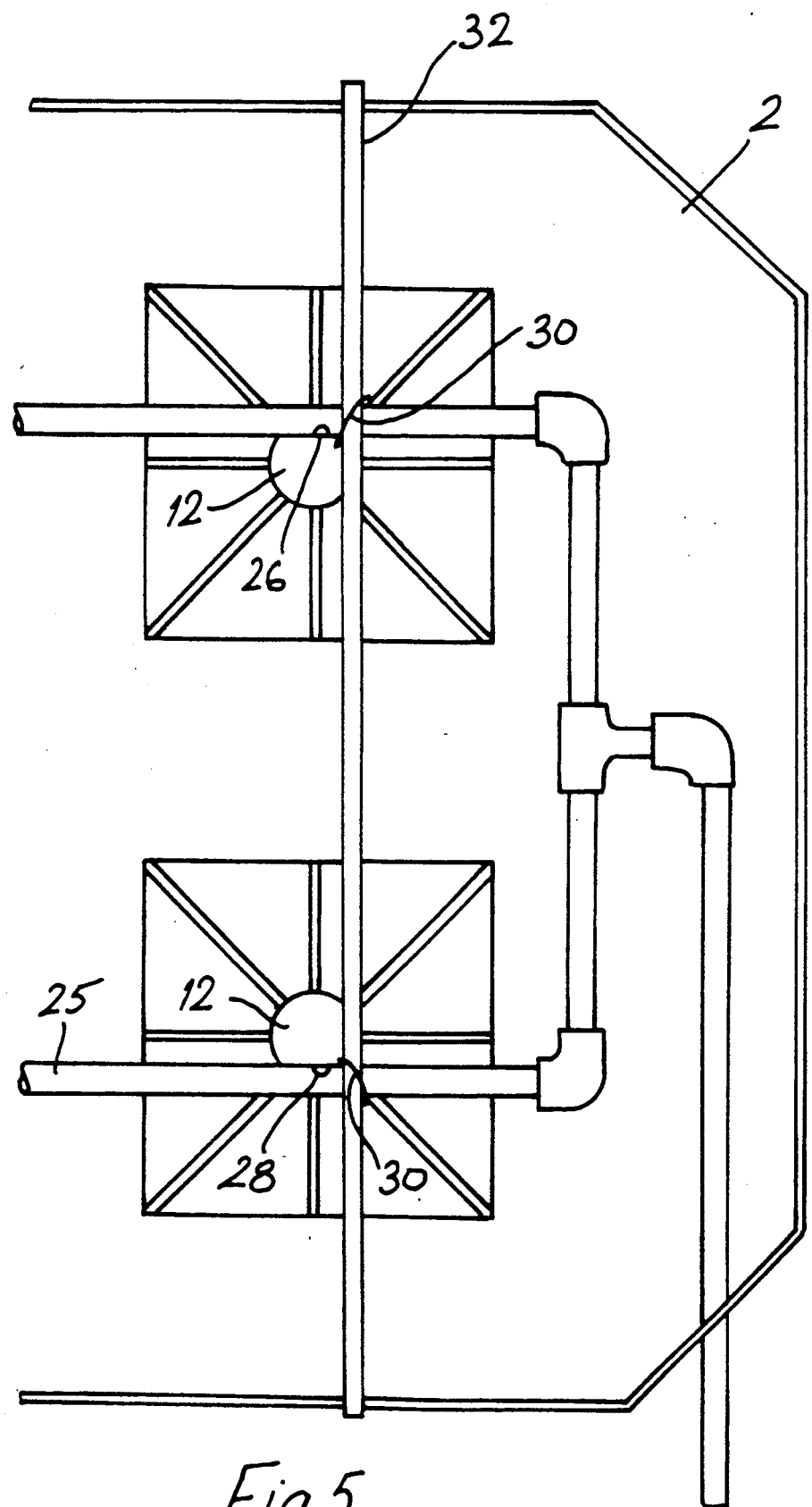
FIG. 5 is a top plan view on an enlarged scale of one module of the treatment system of FIG. 3.

Referring to the drawings and initially to FIGS. 1 to 10 thereof there is illustrated an effluent treatment system according to the invention and indicated generally by the reference numeral 1. The system 1 is in this case for treating treated effluent from a septic tank 50 which receives effluent from a single dwelling 51. The system 1 may be fed by pumping using a pump 52 as illustrated in FIG. 1 or gravity fed as illustrated in FIG. 2. The treatment system 1 is in this case of modular construction and comprises a number of biological treatment modules 2. In this case there are four modules arranged as illustrated in FIG. 5.

Referring particularly to FIGS. 4 to 7 each of the modules 2 comprises a tank or container 5 for a biological treatment medium 6, each container 5 having inlets 7 for effluent from a septic tank 50 and outlets 8 for filtered treatment. The container 5 is in this case closed by an air permeable lid 16 comprising a cover 16 which carries a layer of peat fibre material 17 to reduce odour. The odour control layer of fibrous material may be held in place by a lower plastics mesh layer and, if necessary to retain the fibrous material in place, also an upper plastics mesh layer. Means for distributing effluent over the filter medium 6 of each module 2 in this case comprises four rosette distributors 10, one of which is illustrated in detail in FIGS. 8 to 10. Each distributor 10 has a central inlet 12 and a plurality of spaced-apart outlets 13 which are fed from the common inlet 12 by gravity flow. The distributor is in this case of moulded polystyrene construction and the distributors 10 rest on top of the treatment medium 6 as illustrated in FIG. 7.

In use, the modules 2 are installed partially below ground level 15 as illustrated in FIG. 2 and effluent from a septic tank may be pumped from a sump through a main inlet pipe 20 located below ground level which is connected to a distribution pipe network 21 to the treatment medium 6 by risers 26. Alternatively, the effluent flows by gravity to the treatment plant. The distribution pipe network 25 includes outlet openings 28 which discharge effluent to the central inlets 12 of the rosette distributors 10 as will be apparent from FIG. 5. The main upper distribution pipe network 25 is hung by plastic or wire tied joints 30 from support braces 32.

Figure 6:
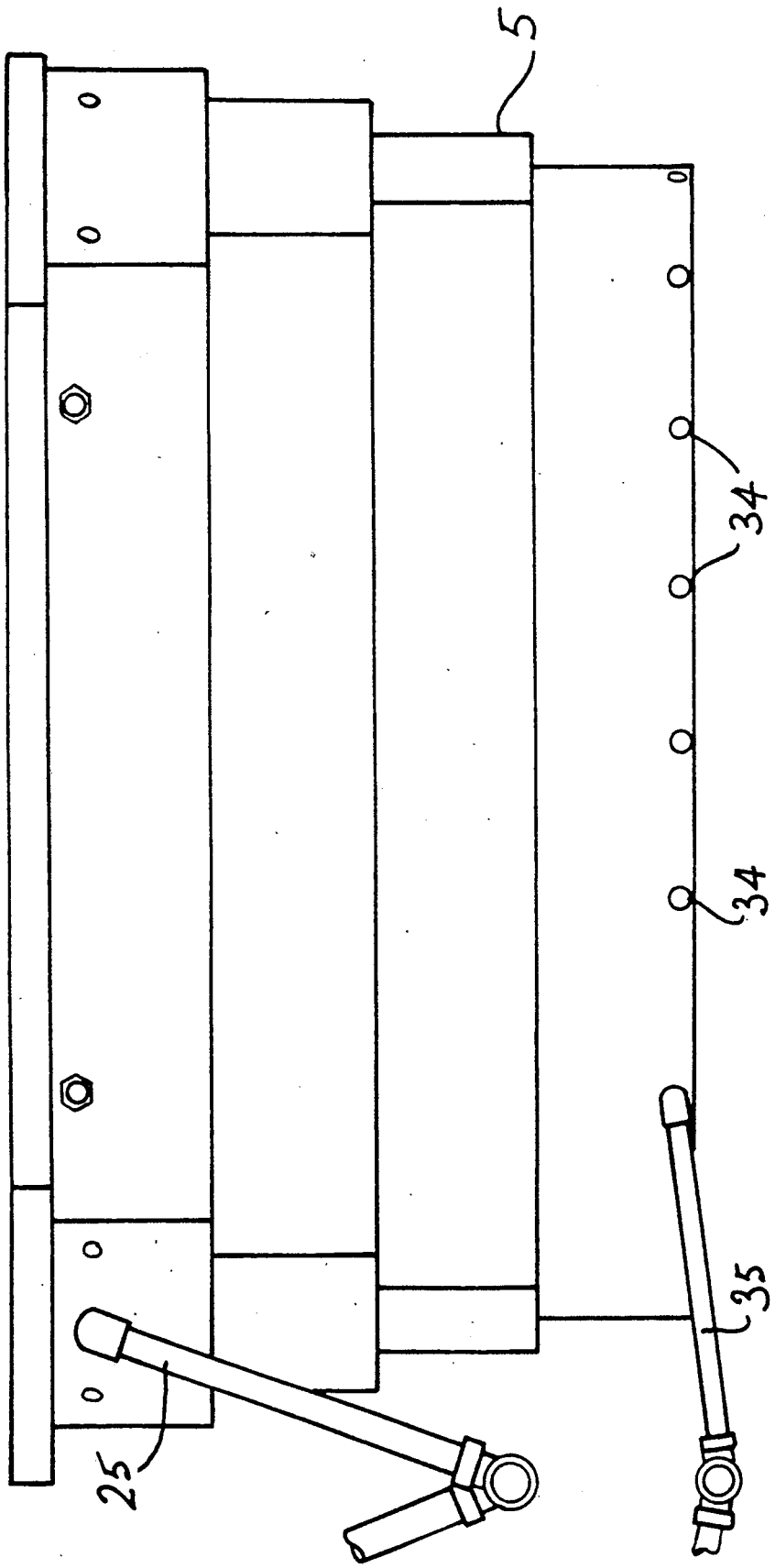
FIG. 6 is a side view of the module of FIG. 5.
Figure 10:
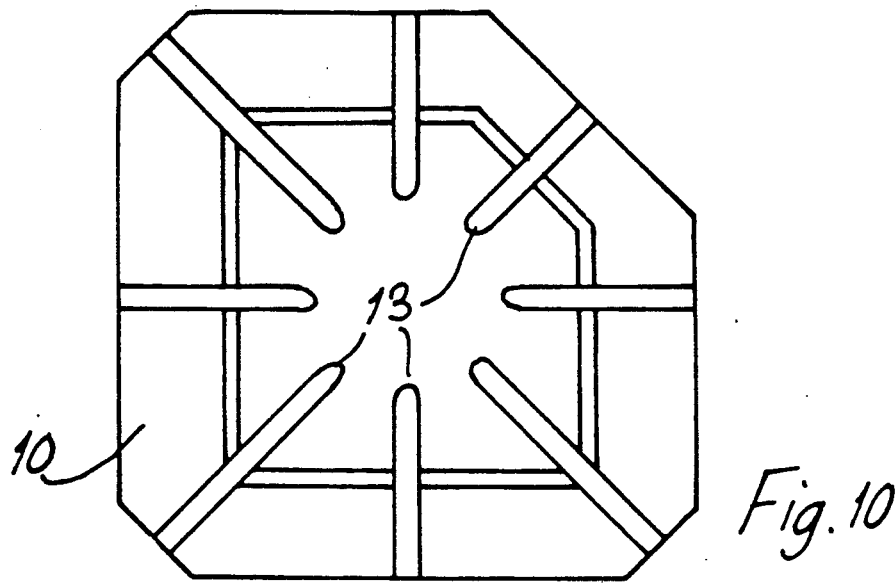
FIG. 10 is an underneath plan view of the distribution portion of FIG. 8.
Figure 9:
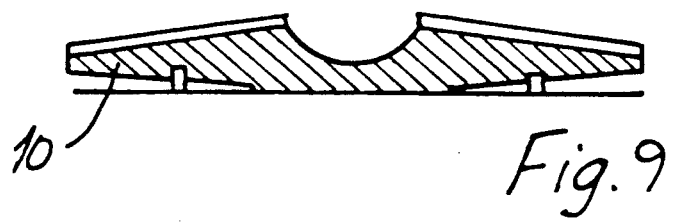
FIG. 9 is a cross-sectional view on the line Z—Z in FIG. 8.
Figure 8:
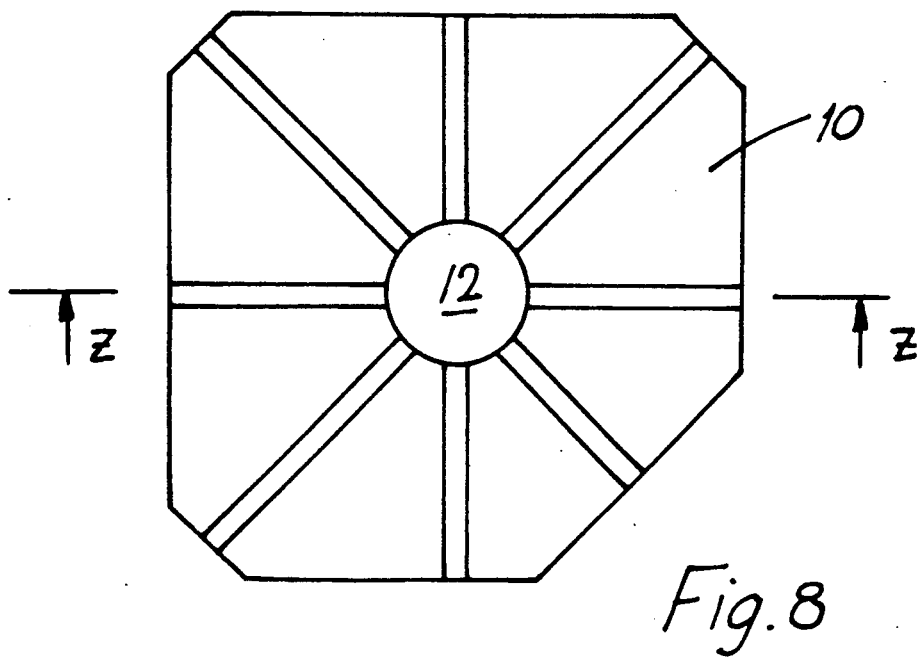
FIG. 8 is a top plan view of one distribution portion of one module.

As will be apparent from FIGS. 4, 6 and 7 the outlets 13 are provided by a plurality of spaced-apart drain holes 34 extending around the base of the container 5 and which discharge to a effluent collection pipe 35 through which the treated effluent passes by gravity flow to a discharge point. It will be noted that the outlets from the treatment system are provided with filters 60 which in this case are of organic heather material or stone chippings of 18 mm average size.

It will be appreciated that the treatment plant 1 is of modular construction and may be sized to accommodate a desired flow of effluent by including more or less modules than those illustrated. The size and configuration of the treatment plant will depend on a number of factors including the quantity and quality of the effluent to be treated. Typically effluent from a septic tank will be discharged into a sump and pumped into the treatment plant, typically at a domestic rate of approximately 750 liters per day. Normally, the discharge would be applied in approximately eight pumping batches and the pumping would be float switch controlled. For larger systems (i.e. multiple house) the inlet pump may be controlled by level probes in the sump and/or perhaps by a timing mechanism.

EFFLUENT TREATED

In all cases the effluent treated by the system of the invention has already passed through a primary treatment step, for example through a septic tank, which removes solids and provides anaerobic treatment of sewage-type effluent.

BIOLOGICAL TREATMENT MEDIUM (a) Peat

The peat used was Von Post approximately $H_1$ grade young Sphagnum peat which in the case of the examples given below contained approximately 70% Sphagnum and 30% humic material by volume. The Sphagnum fraction contained approximately:

30% *S. imbricatum*

15% *S. acutifolium*

5% *S. cuspitatum*

Young Sphagnum peat, by which is meant Sphagnum peat which is less than 2,500 years old, is preferred because of its high water-holding capacity which is generally over ten times its dry weight and has over 95% of its volume in the form of free space or pores.

Preferably the peat used is Von Post grade $H_1$ to $H_3$, most preferably grade $H_1$. The Von Post humification scale is a scale describing peat in varying stages of decomposition. $H_1$ is the least unhumified peat which upon pressing in the hand, gives off colourless clear water. Grade $H_2$ is slightly humified peat which upon pressing in the hand gives off almost clear but yellow-brown water. Grade $H_3$ is very little humified peat which, upon pressing, gives off distinctly turbid water but the residue is not mushy.

(b) Fibrous Material

Preferably the fibrous material is a peat fibre which comprises fragments or pieces of plant tissues excluding live roots that retains the recognisable cellular structure of the plant from which it originated.

In the examples given below the fibrous material used consisted mainly of root residues of eriophorum (cottongrass or bog cotton) plants extracted from bog peats and containing approximately 50% fibre, 40% humic material and 10% sphagnum. The sphagnum fraction consisted of *S. imbricatum, S. acutifolium* and *S. cuspitatum*. The peat and fibrous material are homogenously mixed using a volumetric measure and mixing by hand-fork or alternatively a volumetric measure and a mechanical mixer in the ratios indicated below to provide the biological treatment media.

In more detail, and referring particularly to FIG. 7 each container 5 contains a biological treatment medium 41 comprising a homogeneous mixture of peat and organic fibre as described above to a depth of from 0.5 to 1 meter, preferably approximately 0.75 meters. The medium 41 is covered by a layer 40 of eriophorum peat fibre for distributing the effluent. An additional layer 44 of eriophorum peat fibre is provided below the biological treatment medium to induce flow of treated effluent to the outlets 34.

Figure 11:
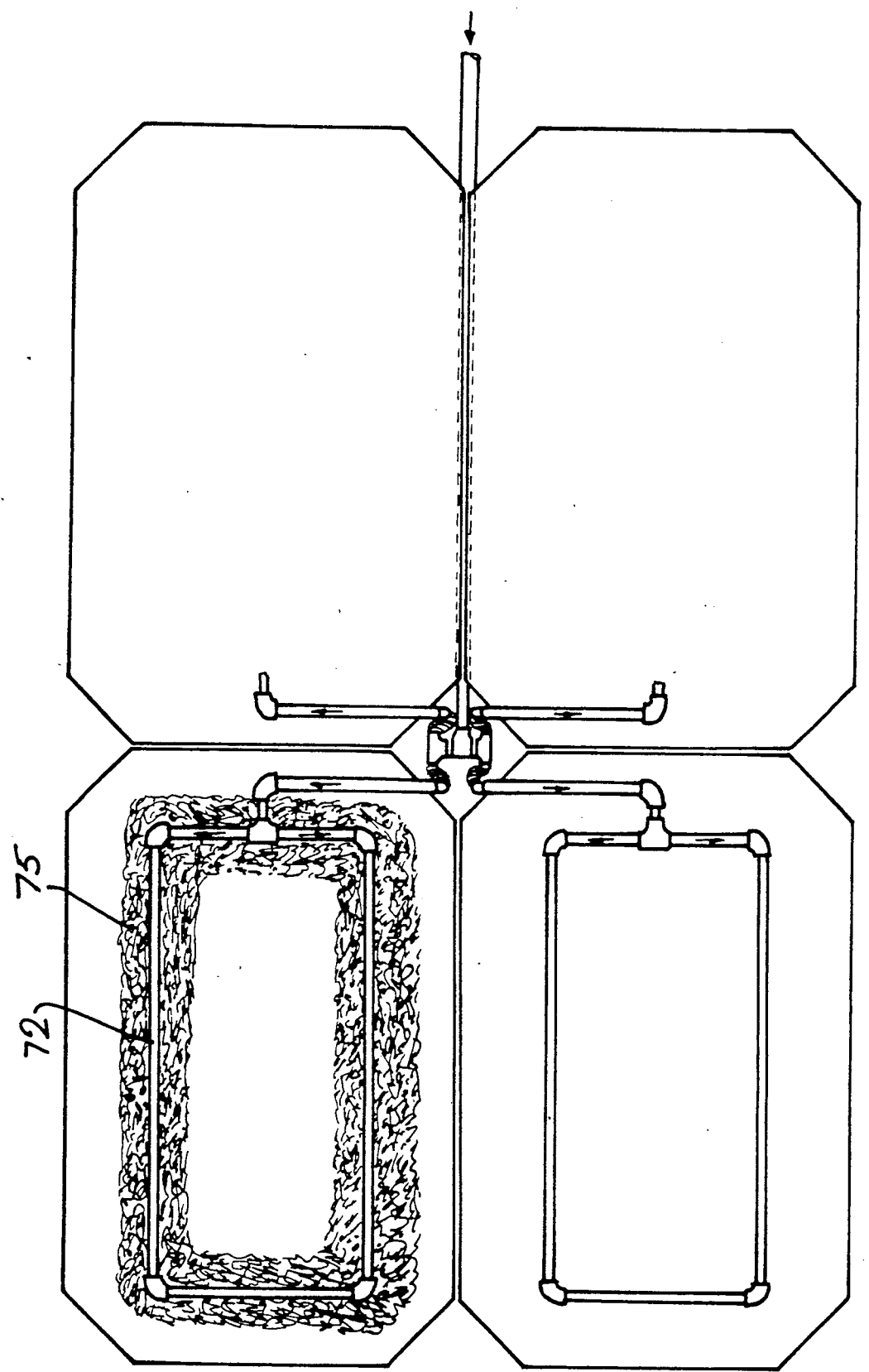
FIG. 11 is a plan view of another system according to the invention.

Referring to FIGS. 11 and 12 there is illustrated another effluent treatment system according to the invention which is similar to the system described above with reference to FIGS. 3 and 12. In this case the means for distributing effluent across the surface of the medium 41 comprises a plurality of pipes 72 each having a plurality of spaced-apart outlet holes 73 for effluent. A layer 75 of stone chippings is provided underneath and around the pipe outlets 73 for spreading and distributing effluent to be treated. Referring to FIG. 13 there is illustrated an alternative effluent treatment system 70 which is similar to the system 1 described above. In this case the container 5 includes a biological treatment medium 41, an upper fibre layer 40 and a lower fibre layer 46, as before. In this case the means for distributing effluent across the surface of the medium 41 comprises a plurality of pipes 72 each having a plurality of spaced-apart outlet holes 73 for effluent. A layer 75 of stone chippings is provided underneath and around the pipe outlets 73 for spreading and distributing effluent to be treated. For odour control and to eliminate light the pipes 72 and stone chippings 75 are covered with a bed 78 of peat with or without fibre.

We have found that this system offers the advantage of simplicity of assembly and cost effectiveness because less parts are required.

Figure 14:
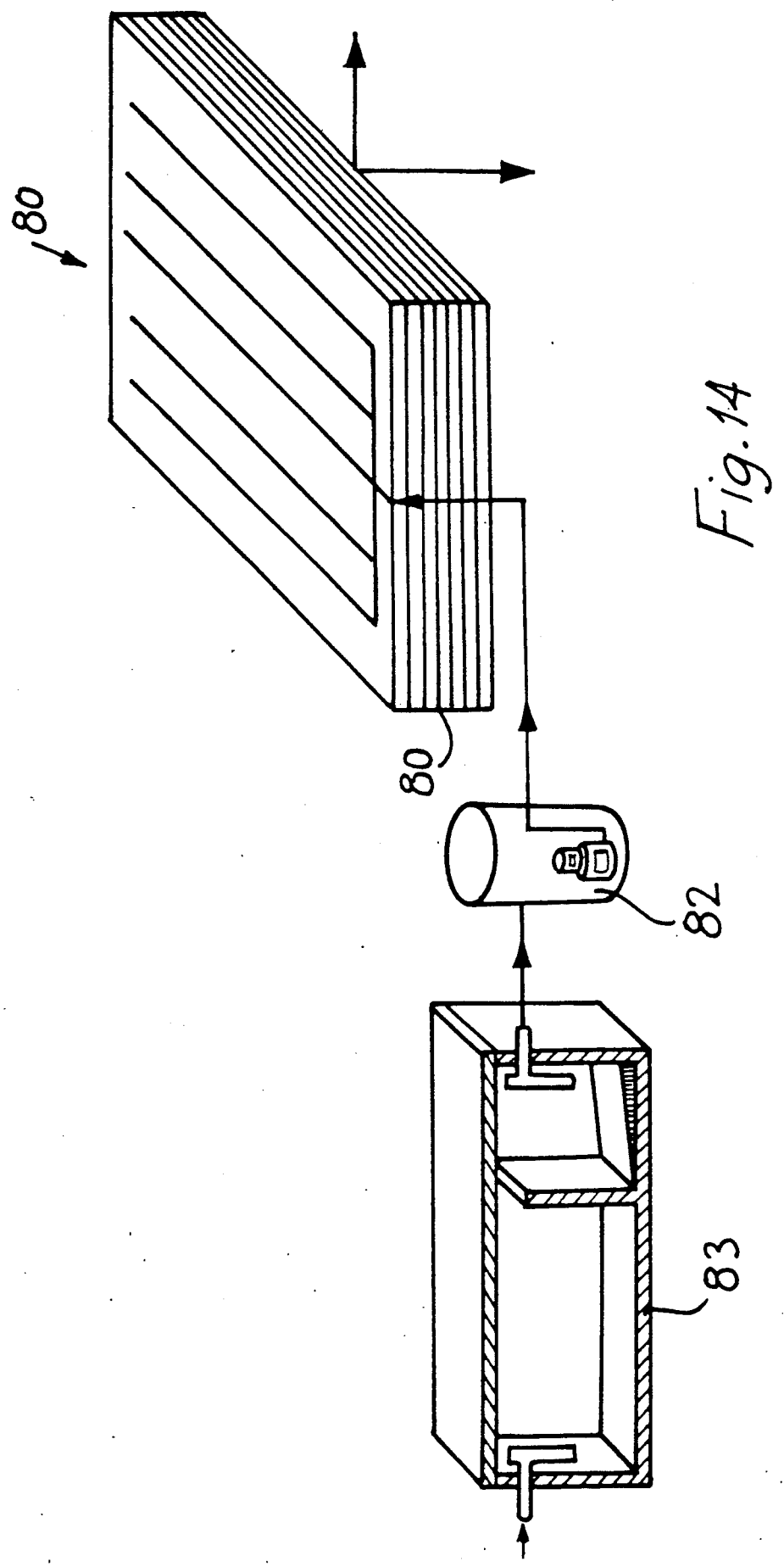
FIG. 14 is a diagrammatic view of another effluent treatment system, in use.

Referring to FIG. 14 there is illustrated another effluent treatment system 80 which in this case is not of modular construction but comprises a single container 81 or silo fed with effluent by a pump 82 from a primary effluent treatment source, in this case a septic tank 83. The container 81 contains a biologically active medium of the type described above with an upper peat fibre layer for distribution of effluent and a lower peat fibre layer for inducing outlet flow. The area of the bed is dictated by the volume of effluent to be handled.

EXAMPLE 1

An effluent treatment system was installed at a municipal site to treat effluent from a primary effluent treatment in which a substantial proportion of the solids had been removed. A single module of the type described above with reference to FIGS. 3 to 10 of size 2.5 meters by 1.4 meters was used. The depth of the biologically active peat/fibre homogenous mixture was approximately 0.75 meters. The biological treatment medium was an 80/20 peat fibre ratio in a homogenous mixture at 50% compaction. The system was loaded at 7 centimeters per day in 10 pumpings. A rosette type distributor was used.

A summary of the results is set out below.

It will be noted that an average reduction in biological oxygen demand (B.O.D.) of 97%, an average reduction in total suspended solids (T.S.S.) of 93%, and an average reduction in coliforms of over 99% was achieved.

Because a peat/fibre mixture was used no ponding was observed even at the relatively high loading of 7 cm/day used.

TEST RESULTS: EXAMPLE 1

| PARAMETER | | 20/9/89 | 28/9/89 | 5/10/89 | 11/10 | 26/10 | 2/11 | 8/11 | 22/11 | 29/11 | 6/12 |
|---|---|---|---|---|---|---|---|---|---|---|---|
| B.O.D. (mg/l) | B | 241 | 272 | 191 | 286 | 291 | 126 | 120 | 120 | 203 | 227 |
| | A | 9 | 3 | 10 | 6 | 9 | 7 | 5 | 3 | 6 | 12 |
| T.S.S. (mg/l) | B | 47 | 62 | 65 | 72 | 92 | 44 | 12 | 89 | 54 | 59 |
| | A | 1 | 5 | 16 | 4 | 3 | 2 | 4 | 3 | 2 | 2 |
| pH | B | 7.7 | 7.4 | 7.4 | 7.9 | 7.9 | 7.7 | 7.4 | 7.8 | 7.8 | 7.7 |
| | A | 3.8 | 3.7 | 4.0 | 4.3 | 6.3 | 6.1 | 6.3 | 6.3 | 6.5 | 6.1 |
| Conductivity | B | 750 | 900 | 740 | 800 | 680 | 720 | 680 | 830 | 820 | 770 |
| K @ 20° C. | A | 280 | 370 | 430 | 360 | 420 | 360 | 490 | 635 | 640 | 670 |
| Colour | B | >250 | >250 | >250 | >250 | >250 | >250 | >250 | 250 | >250 | >250 |
| (Hazen units) | A | 100 | 225 | >250 | >250 | >250 | >250 | >250 | >250 | >250 | >250 |
| Total Viable | B | | | | | | | $0.5 \times 10^8$ | | $6.4 \times 10^6$ | |
| Count @ 37° C. (per ml) | A | | | | | | | $8.3 \times 10^2$ | | $1.6 \times 10^3$ | |
| Total Coliform | B | | | | | | | $>1.8 \times 10^7$ | | $>1.8 \times 10^7$ | |
| (per 100 ml) | A | | | | | | | $>1.8 \times 10^4$ | | $5 \times 10^3$ | |
| E-Coliform | B | | | | | | | $2.5 \times 10^8$ | | $3 \times 10^5$ | |

-continued

TEST RESULTS: EXAMPLE 1

| PARAMETER | | 20/9/89 | 28/9/89 | 5/10/89 | 11/10 | 26/10 | 2/11 | 8/11 | 22/11 | 29/11 | 6/12 |
|---|---|---|---|---|---|---|---|---|---|---|---|
| (per 100 ml) | A | | | | | | | $9 \times 10^3$ | | $7 \times 10^2$ | |

A represents a sample taken before the effluent treatment module
B represents a sample taken after the effluent treatment module

EXAMPLE 2

Example 1 was duplicated using a biological treatment medium having a 50/50 peat/fibre ratio in a homogenous mixture at 50% compaction.

A summary of the results is set out below.
It will be noted that
an average reduction in B.O.D. of 96%,
an average reduction in T.S.S. of 92%, and
an average reduction in coliforms of greater than 99% was achieved.

No ponding was observed. The drainability of the medium was improved by incorporating additional fibre than in Example 1 without a significant decrease in the biological treatment performance of the system.

It will be noted that
an average reduction in B.O.D. of 84%, and
an average reduction in T.S.S. of 89% was achieved.
an average reduction in Ammonia of 60% was achieved.

The loadings applied were extremely high, however, the unit performed well and no ponding was observed because of the incorporation of a relatively large proportion of fibre in the biologically active treatment medium.

We claim:
1. An effluent treatment system for treating effluent which has passed through a primary treatment to remove a substantial proportion of solids comprising:
   a container having an upper inlet for effluent from a primary treatment and a lower outlet for treated effluent, and
   a biological effluent treatment medium in the container,
   the biological effluent treatment medium comprising a homogenous mixture of biologically active peat and a fibrous material comprising the root residues of eriophorum (cotton grass) plants extracted from bog peat.

TEST RESULTS: EXAMPLE 2

| PARAMETER | | 20/9/89 | 28/9/89 | 5/10/89 | 11/10/89 | 26/10 | 2/11 | 8/11 | 22/11 | 29/11 | 6/12 |
|---|---|---|---|---|---|---|---|---|---|---|---|
| B.O.D. (mg/l) | B | 241 | 272 | 191 | 286 | 291 | 126 | 120 | 120 | 203 | 227 |
|  | A | 10 | 15 | 14 | 8 | 9 | 8 | 7 | 4 | 7 | 11 |
| T.S.S. (mg/l) | B | 47 | 62 | 65 | 72 | 92 | 44 | 12 | 89 | 54 | 59 |
|  | A | 1 | 9 | 15 | 6 | 5 | 3 | 2 | 3 | 3 | 2 |
| pH | B | 7.7 | 7.4 | 7.4 | 7.9 | 7.9 | 7.7 | 7.4 | 7.8 | 7.8 | 7.7 |
|  | A | 3.7 | 3.9 | 4.5 | 5.7 | 7.0 | 6.8 | 6.5 | 6.8 | 6.8 | 6.7 |
| Conductivity | B | 750 | 900 | 740 | 800 | 680 | 720 | 680 | 830 | 820 | 770 |
| K @ 20° C. | A | 310 | 355 | 410 | 375 | 495 | 470 | 530 | 675 | 660 | 720 |
| Colour | B | >250 | >250 | >250 | >250 | >250 | >250 | >250 | 250 | >250 | >250 |
| (Hazen units) | A | 125 | >250 | >250 | >250 | >250 | >250 | >250 | >250 | 250 | 250 |
| Total Viable | B | | | | | | | $5 \times 10^5$ | | $6.4 \times 10^6$ | |
| Count @ 37° C. (per ml) | A | | | | | | | $1.5 \times 10^3$ | | $2 \times 10^4$ | |
| Total Coliform | B | | | | | | | $>1.8 \times 10^7$ | | $>1.8 \times 10^7$ | |
| (per 100 ml) | A | | | | | | | $>1.8 \times 10^4$ | | $2 \times 10^3$ | |
| E-Coliform | B | | | | | | | $2.5 \times 10^8$ | | $3 \times 10^5$ | |
| (per 100 ml) | A | | | | | | | $>1.8 \times 10^4$ | | $8 \times 10^2$ | |

A represents a sample taken before the effluent treatment module
B represents a sample taken after the effluent treatment module

EXAMPLE 3

A treatment system was installed at an industrial site to treat effluent from septic tanks and large yard run-off, the latter of which includes animal food debris.

Figure 12:
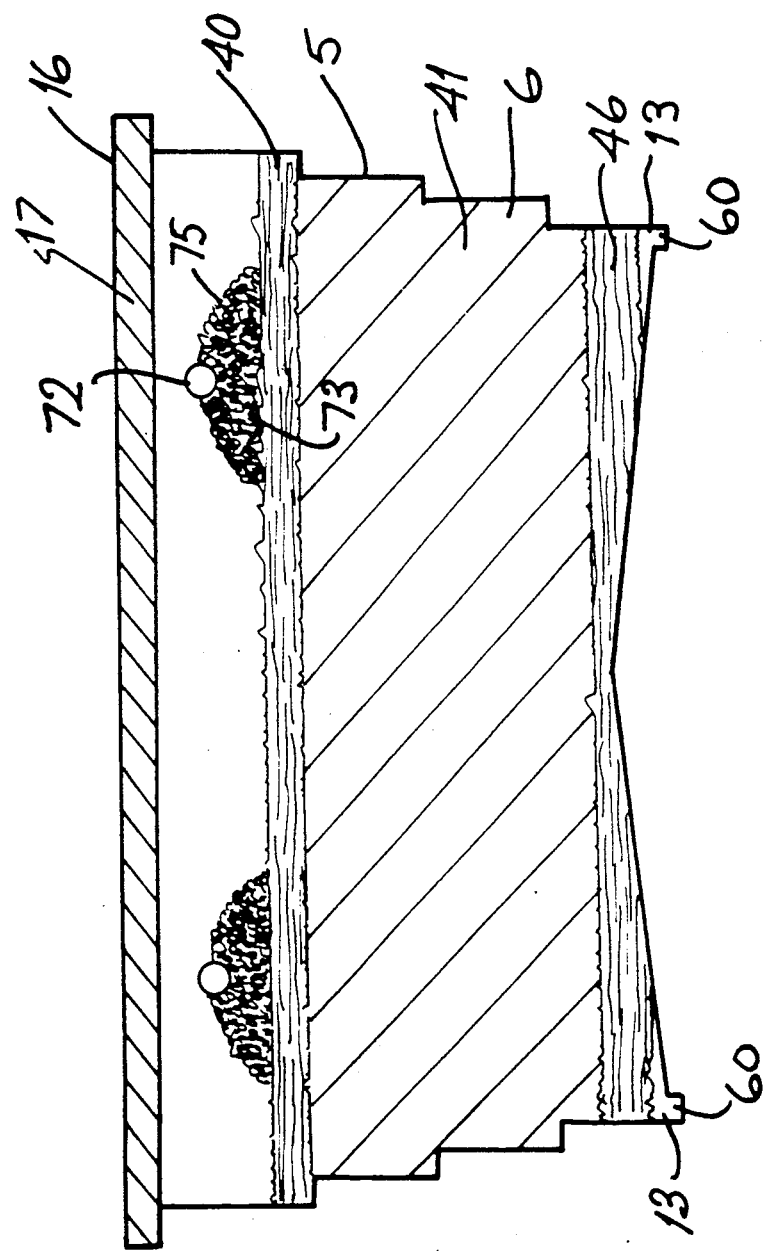
FIG. 12 is a side cross-sectional view of a module of the system of FIG. 11.
Figure 13:
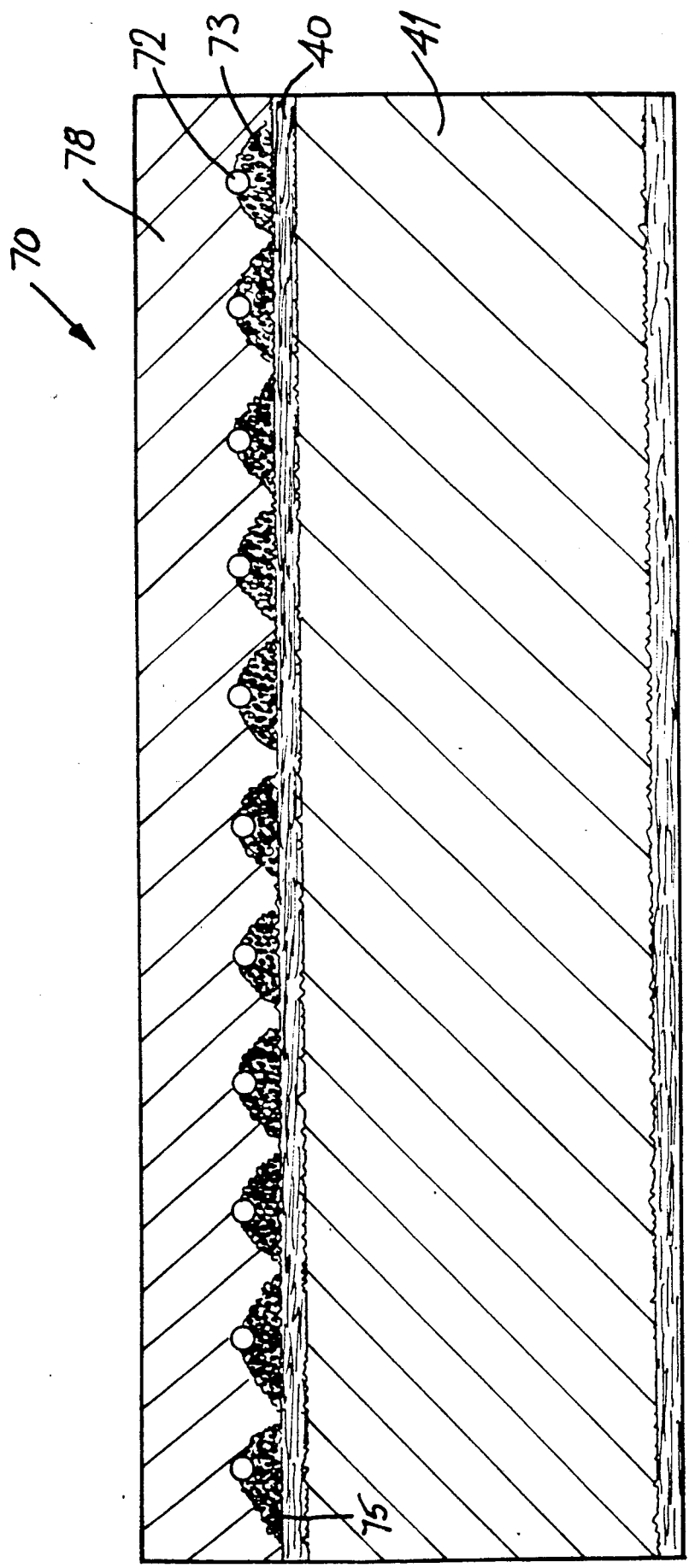
FIG. 13 is a schematic side cross-sectional view of another effluent treatment system according to the invention.

A system similar to that illustrated in FIG. 12 was used using a single housing having an area of 50 square meters.

The system used an 20/80 peat/fibre ratio at a compaction of 50% and was loaded at 15 cm/day initially. This was increased to 20 cm/day from Aug. 22, 1989.

A summary of the results is set out below.

| | | Date of Sample 1989 | | | | | | | |
|---|---|---|---|---|---|---|---|---|---|
| | | 24/5 | 23/6 | 13/7 | 16/8 | 22/8 | 1/9 | 4/10 | 2/11 | 29/11 |
| B.O.D. mg/l | B | 34 | 44 | 34 | 43 | 37 | 65 | 80 | 27 | 66 |
|  | A | 30 | 2 | 7 | 3 | 4 | 4 | 9 | 0 | 6 |
| T.S.S. mg/l | B | 48 | 68 | 25 | 30 | 35 | 43 | 40 | 7 | 21 |
|  | A | 8 | 8 | 7 | 4 | 1 | 4 | 1 | 1 | 4 |
| AMMONIA | B | 21 | 11 | 9 | 8 | 6 | 8 | 7 | 10 | 11 |
| $NH_4^+$ (mg/l) | A | 15 | 4 | 1 | 1 | 1 | 2 | 1 | 6 | 3 |

A represents a sample taken before the effluent treatment module
B represents a sample taken after the effluent treatment module 2. A system as claimed in claim 1 wherein the ratio of peat to fibrous material in the medium is in the range of 10:90 to 90:10 by volume.

3. A system as claimed in claim 1 wherein the ratio is from 20:80 to 80:20.

4. A system as claimed in claim 1 wherein the ratio is approximately 50:50.

5. A system as claimed in any of claim 1 wherein the biologically active peat is a young Sphagnum peat.

6. A system as claimed in claim 5 wherein the peat is of a Von Post humification scale of from $H_1$ to $H_3$ grade.

7. A system as claimed in claim 6 wherein the peat is a Von Post $H_1$ grade.

8. A system as claimed in claim 1 wherein the mixture is compacted by from 20% to 75% by volume.

9. A system as claimed in claim 8 wherein the mixture is compacted by from 30% to 60% by volume.

10. A system as claimed in claim 9 wherein the mixture is compacted approximately 50% by volume.

11. A system as claimed in claim 1 wherein an upper effluent distribution medium is provided above the biological effluent treatment medium.

12. A system as claimed in claim 11 wherein the distribution medium is of an organic fibrous material.

13. A system as claimed in claim 1 wherein a lower outlet flow inducing medium is provided below the biological effluent treatment medium at or adjacent to the effluent outlet.

14. A system as claimed in claim 13 wherein the outlet flow inducing medium is an organic fibrous material.

15. A system as claimed in claim 1 wherein the depth of the effluent treatment medium is in the range 0.5 to 1.0 meters.

16. A system as claimed in claim 1 wherein the surface area of the effluent treatment medium is at least 7 square meters for a hydraulic loading of in the order of 7cm to 15cm per day of effluent.

17. A system as claimed in claim 1 wherein the container is of a modular form, a number of containers being joined together and the effluent to be treated being spread across the containers, in parallel flow.

18. An effluent treatment system for treating effluent which has passed through a primary treatment to remove a substantial proportion of solids comprising
    (a) a container having an upper inlet for effluent from a primary treatment and a lower outlet for treated effluent, and
    (b) a biological effluent treatment medium in the container.
        the biological effluent treatment medium comprising a homogenous mixture of biologically-active peat and a fibrous material, the container having a top opening closed by an air permeable lid, and the lid comprising a perforated cover having an odor control layer of fibrous peat material.

19. An effluent treatment system for treating effluent which has passed through a primary treatment to remove a substantial proportion of solids comprising
    (a) a container having an upper inlet for effluent from a primary treatment and a lower outlet for treated effluent, and
    (b) a biological effluent treatment medium in the container,
        the biological effluent treatment medium comprising a homogenous mixture of biologically-active peat and a fibrous material,
        wherein the system includes means for distributing effluent across the surface of the effluent treatment medium, said effluent distributing means comprising at least one pipe extending above the treatment medium, the at least one pipe having a plurality of spaced-apart outlet holes, a layer of stone chippings being provided underneath the pipe outlets and a layer of peat material being provided above the chippings to spread and distribute effluent to be treated.

20. A system as claimed in claim 19 wherein the means for distributing effluent comprises a rosette type distributor having a central inlet and a plurality of spaced-apart outlets fed from the common inlet.

21. A system as claimed in claim 19 wherein the means for distributing effluent comprises a sheet of corrugated material having a plurality of spaced-apart outlet holes.

* * * * *

UNITED STATES PATENT AND TRADEMARK OFFICE
CERTIFICATE OF CORRECTION

PATENT NO. : 5,049,265
DATED : September 17, 1991
INVENTOR(S) : High Fairman Boyd, et al.

It is certified that error appears in the above-identified patent and that said Letters Patent is hereby corrected as shown below:

On the Title Page, Section [73]: delete "; Wavin Ireland Limited, both"

Column 2, line 15: "consistsa" should read as --consists--

Column 6, lines 52 & 53: delete "SAMPLE DATE" and after "PARAMETER" insert --SAMPLE DATE--

Column 6, line 64: "0.5 x $10^8$" should read as --0.5 x $10^6$--

Column 6, line 68: "2.5 X $10^8$" should read as --2.5 x $10^6$--

Column 8, lines 27 & 28: delete "SAMPLE DATE" and after "PARAMETER" insert --SAMPLE DATE--

Column 8, line 42; "2.5 x $10^8$" should read as --2.5 x $10^6$--

Signed and Sealed this

Twenty-seventh Day of April, 1993

*Attest:*

MICHAEL K. KIRK

*Attesting Officer*  *Acting Commissioner of Patents and Trademarks*